US011593251B2

(12) United States Patent
Chirkin et al.

(10) Patent No.: US 11,593,251 B2
(45) Date of Patent: Feb. 28, 2023

(54) TECHNIQUES FOR LARGE-SCALE FUNCTIONAL TESTING IN CLOUD-COMPUTING ENVIRONMENTS

(71) Applicant: Oracle International Corporation, Redwood Shores, CA (US)

(72) Inventors: Michael Chirkin, Bothell, WA (US); Mohammed Yousuf Pariyani, Kent, WA (US); Heng-Yi Lin, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/191,013

(22) Filed: Mar. 3, 2021

(65) Prior Publication Data
US 2022/0283926 A1 Sep. 8, 2022

(51) Int. Cl.
*G06F 9/44* (2018.01)
*G06F 11/36* (2006.01)

(52) U.S. Cl.
CPC ...... *G06F 11/3612* (2013.01); *G06F 11/3664* (2013.01); *G06F 11/3688* (2013.01); *G06F 11/3692* (2013.01)

(58) Field of Classification Search
CPC ............. G06F 11/3612; G06F 11/3664; G06F 11/3688; G06F 11/3692
See application file for complete search history.

(56) References Cited

U.S. PATENT DOCUMENTS

| 7,814,491 B1 * | 10/2010 | Chen ..................... G06F 9/5077 718/100 |
| 8,032,634 B1 * | 10/2011 | Eppstein ................. H04L 67/34 709/226 |
| 2003/0098879 A1 * | 5/2003 | Mathews ............ G06F 11/3688 714/E11.208 |
| 2008/0201556 A1 * | 8/2008 | Chen ..................... G06F 8/433 712/216 |
| 2014/0137087 A1 * | 5/2014 | Cimadamore ........ G06F 9/4484 717/140 |
| 2014/0215269 A1 * | 7/2014 | Sung ..................... G06F 11/261 714/28 |
| 2018/0365138 A1 * | 12/2018 | Bain ....................... G06F 11/36 |

* cited by examiner

*Primary Examiner* — Hang Pan
(74) *Attorney, Agent, or Firm* — Kilpatrick Townsend & Stockton LLP

(57) ABSTRACT

Techniques are disclosed for generating an execution plan for performing functional tests in a cloud-computing environment. Infrastructure resources and capabilities (e.g., system requirements) may be defined within an infrastructure object (e.g., a resource of a declarative infrastructure provisioner) that stores a code segment that implements the resource or capability. Metadata may be maintained that indicates what particular capabilities are applicable to each infrastructure resource. Using the metadata, the system can generate an execution plan by combining code segments for each resource with code segments defining each capability in accordance with the metadata. The execution plan may include programmatic instructions that, when executed, generate a set of test results. The system can execute instructions that cause the set of test results to be presented at a user device.

20 Claims, 13 Drawing Sheets

| 400 | Capability 1 | Capability 2 | Capability 3 | Capability 4 | Capability 5 | Capability 6 | Capability 7 | Capability 8 | Capability 9 | Capability 10 | Capability 11 | Capability 12 | Capability 13 | Capability 14 |
|---|---|---|---|---|---|---|---|---|---|---|---|---|---|---|
| Resource 1 | . | . | . | . | . | . | . | * | * | * | / | / | . | . |
| Resource 2 | . | . | . | . | . | . | . | * | * | * | . | . | . | . |
| Resource 3 | . | . | . | . | . | . | . | * | * | * | . | . | . | . |
| Resource 4 | . | . | . | . | . | . | . | * | * | * | . | . | . | . |
| Resource 5 | X | X | X | X | X | X | X | X | X | X | X | X | X | X |
| Resource 6 | . | . | . | . | . | . | . | * | * | * | . | . | . | . |
| Resource 7 | / | / | / | / | / | / | / | * | * | * | / | / | / | / |
| Resource 8 | . | . | . | . | . | . | . | * | * | * | . | . | . | . |
| Resource 9 | . | . | . | . | . | . | . | * | * | * | . | . | . | . |
| Resource 10 | . | . | . | . | . | . | . | * | * | * | . | . | . | . |
| Resource 11 | . | . | . | . | . | . | . | * | * | * | . | . | . | . |
| Resource 12 | . | . | . | . | . | . | . | * | * | * | . | . | . | . |
| Resource 13 | . | . | . | . | . | . | . | * | * | * | . | . | . | . |
| Resource 14 | . | . | . | . | . | . | . | * | * | * | . | . | . | . |

402

Legend 404

Status 1: [ . ]  Status 2: [ * ]  Status 3: [ / ]  Status 4: [ X ]

Capability 1(C1):
 1. Create resource placeholder
 2. Execute operation(s) (e.g., "A, B, C") directed to testing the capability Capability 1(C2):
 1. Execute operation(s) for creating a first resource (e.g., a user)
 2. Create resource placeholder
 3. Execute operation(s) (e.g., "A, D, E, F") directed to testing the capability 1. Execute operation(s) for testing capability C1 with a first resource R1 (Algorithm 602)
   - Execute operation(s) for creating resource R1 (Algorithm 502)
   - Execute operation(s) A with R1
   - Execute operation(s) B with R1
   - Execute operation(s) C with R1
2. Execute operation(s) for testing capability C1 with a second resource R2 (Algorithm 602)
   - Execute operation(s) for creating resource R2 (Algorithm 504)
     - Execute operation(s) for creating a first resource (e.g., a VCN)
     - Execute operation(s) for extracting metadata of the first resource
     - Use resource 1's extracted metadata to execute operation(s) for creating a second resource (e.g., a subnet)
     - Execute operation(s) for extracting metadata of the second resource
     - Use the second resource's extracted metadata to execute operation(s) for creating R2 (e.g., a virtual machine)
   - Execute operation(s) A with R2
   - Execute operation(s) B with R2
   - Execute operation(s) C with R2
3. Execute operation(s) for testing capability C2 with a first resource R3 (Algorithm 604)
   - Execute operation(s) for creating resource R3 (Algorithm 502)
   - Execute operation(s) A with R3
   - Execute operation(s) D with R3
   - Execute operation(s) E with R3
   - Execute operation(s) F with R3
4. Execute operation(s) for testing capability C2 with a second resource R4 (Algorithm 604)
   - Execute operation(s) for creating resource R4 (Algorithm 504)
     - Execute operation(s) for creating a first resource (e.g., a VCN)
     - Execute operation(s) for extracting metadata of the first resource
     - Use resource 1's extracted metadata to execute operation(s) for creating a second resource (e.g., a subnet)
     - Execute operation(s) for extracting metadata of the second resource
     - Use the second resource's extracted metadata to execute operation(s) for creating R4 (e.g., a virtual machine)
   - Execute operation(s) A with R4
   - Execute operation(s) D with R4
   - Execute operation(s) E with R4
   - Execute operation(s) F with R4

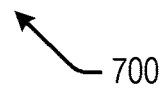

TECHNIQUES FOR LARGE-SCALE FUNCTIONAL TESTING IN CLOUD-COMPUTING ENVIRONMENTS

BACKGROUND

Container orchestration tools provide a robust framework for managing and deploying containerized applications across a cluster of computing nodes in a computing environment. Examples of these tools include, for instance, Kubernetes, Open Shift, Docker Swarm, and the like. The usage of these tools has dramatically increased in the recent years with the rising popularity of cloud-based services and changes in the design of services/applications from large and monolithic systems to highly distributed and micro-service based systems.

Verifying functional requirements of various resources in such environments can be an arduous task. To ensure that these functional requirements are met, a number of tests may be employed. These tests are typically manually written by trained engineers. As the number of resources in a system increases, the task of verifying these requirements increases exponentially. Existing techniques include to manually generate functional tests are tedious, require specialized personnel, and do not scale to the size and complexity of these systems.

BRIEF SUMMARY

Techniques are provided (e.g., a method, a system, non-transitory computer-readable medium storing code or instructions executable by one or more processors) for adjusting the number of nodes of a computing cluster in response to actual and/or predicted changes in one or more performance metrics of the computing cluster. Various embodiments are described herein, including methods, systems, non-transitory computer-readable storage media storing programs, code, or instructions executable by one or more processors, and the like.

One embodiment is directed to a method for generating an execution plan for performing functional tests in a cloud-computing environment. The method may comprise maintaining a first set of code segments. In some embodiments, each code segment of the first set of code segments individually comprising programmatic instructions for generating a resource of a set of resources of a cloud-computing environment. The programmatic instructions may comprise a first set of functions calls of a limited set of function calls that are optimized for generating execution plans in the cloud-computing environment. The method may further comprise maintaining a second set of code segments. In some embodiments, each code segment of the second set of code segment may comprise respective programmatic instructions defining a capability of a set of capabilities of the cloud-computing environment. The respective programmatic instructions may comprise a second set of function calls of the limited set of function calls. The method may further comprise obtaining metadata indicating a corresponding set of capabilities that are applicable for each resource of the set of resources. The method may further comprise generating an execution plan based at least in part on combining the first set of code segments for generating the set of resources and the second set of code segments defining the set of capabilities. In some embodiments, the execution plan is generated in accordance with the metadata indicating the corresponding set of capabilities that are applicable for individual resources of the set of resources.

The method may further comprise generating a set of test results based at least in part on executing the execution plan. In some embodiments, redundant programming instructions may be removed from the execution plan prior to executing the execution plan. The method may further comprise executing instructions that cause a result for each of the set of test results to be displayed at a user device.

In some embodiments, a subset of function calls of the limited set of function calls relate to at least one of: calling a first application programming interface of the cloud-computing environment, calling a second application programming interface of a declarative infrastructure provisioner, manipulating data associated with a respective resource or respective capability, executing Boolean logic with at least one resource or at least one capability, importing programmatic instructions associated with a particular resource, or importing programmatic instructions associated with a particular capability. In some embodiments, the result for each of the set of test results is presented in a graphical matrix.

In some embodiments, the declarative infrastructure provisioner is configured to define and provision infrastructure resources using a declarative configuration language.

In some embodiments, the execution plan comprises programmatic instructions for executing a test corresponding to each capability that is applicable to a given resource.

In some embodiments, at least one function call in the limited set of function calls comprises two or more overloaded functions, wherein a particular overloaded function is selected for execution based at least in part on a set of parameters used to call the at least one function call.

Another embodiment is directed to a computing device comprising one or more processors and one or more memories storing computer-executable instructions that, when executed by the one or more processors, cause and/or configure the computing device to perform the method described above.

Another embodiment is directed to a non-transitory computer-readable medium storing computer-executable instructions that, when executed by one or more processors of a computing device, cause the computing device to perform the method described above.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Various embodiments in accordance with the present disclosure will be described with reference to the drawings, in which:

FIG. 4 depicts an example graphical interface element for presenting test results, in accordance with at least one embodiment.

FIG. 7 depicts an example execution plan for testing the capabilities of FIG. 6 as executed with the resources of FIG. 5, in accordance with at least one embodiment.

DETAILED DESCRIPTION

Figure 1:
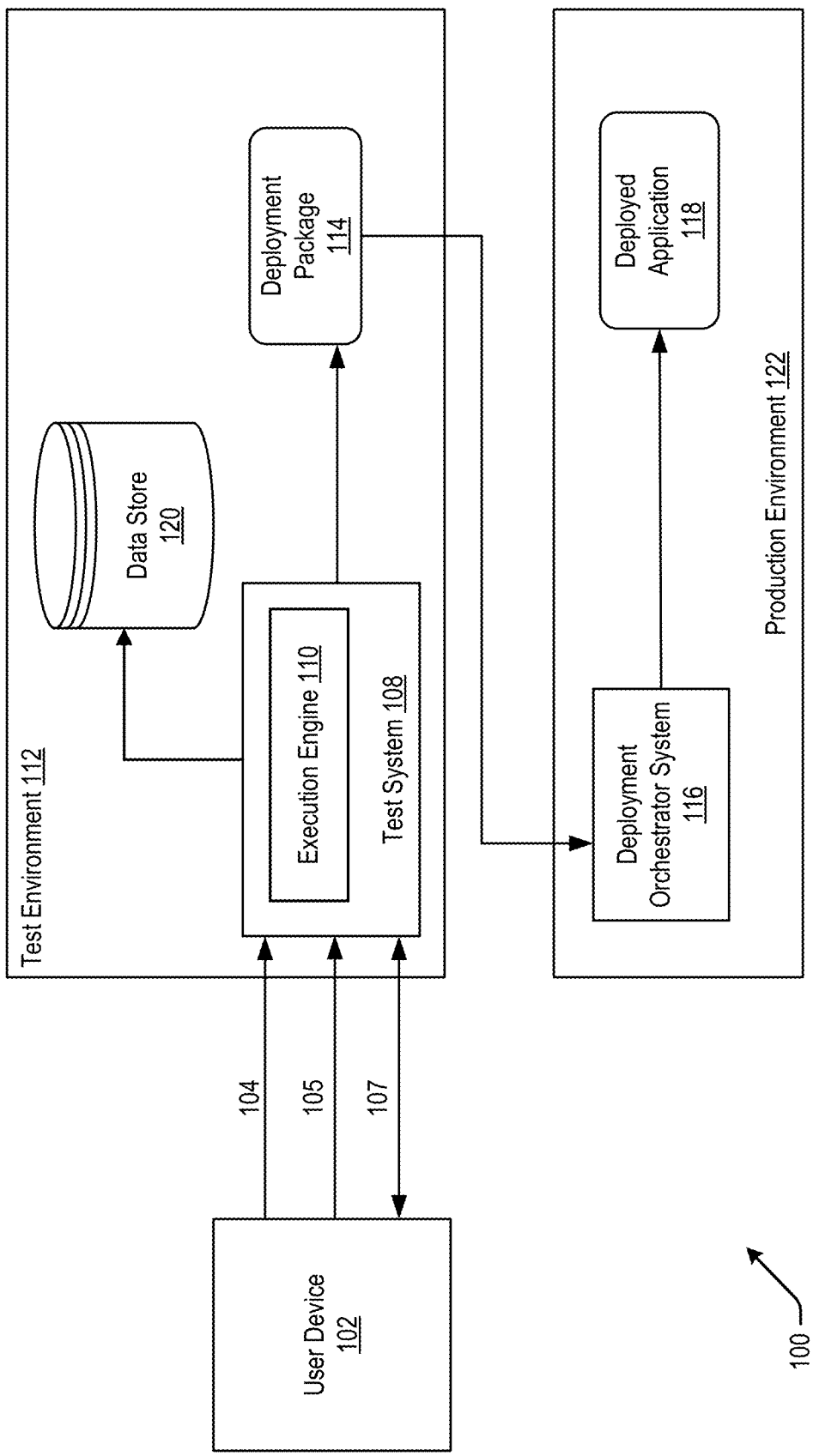
FIG. 1 depicts an example of a computing environment 100 for generating execution plans to test capabilities of various resources deployed in the computing environment, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

To ensure consistency across services in a cloud-computing environment, each resource may be required to pass a predefined set of requirements as a prerequisite to being released to the public. As used herein, an "infrastructure resource", also referred to as a "resource" for brevity, may include any suitable infrastructure component of the cloud-computing environment including virtual networks, compute instances, domain name service records, containers, databases, object storage, load balancers, Application Programming Interface (API) gateways, and the like. These set of requirements can relate to services that handle authentication, accounts, compartments, limits, metering, monitoring, enhancements, and tagging, to name a few. Some of these services may include, but are not limited to:

- Identity—ensures users (e.g., tenants) can safely control access to all services in a consistent, predictable and usable manner via (a) individuals, (b) groups, (c) allow-based policies, and (d) federation.
- Accounts—centrally manage tenancy creation, quota suspension, fraud mitigation, and resource reclamation.
- Compartments—work across all resource types to allow users to map existing enterprise hierarchical mechanisms into a single cloud account for centralized billing, finance, usage, integration, and access management while still providing organizational flexibility (teams, projects, and initiatives).
- Limits—allows the cloud-provider to set default limits and overrides on resources for all users enabling fraud protection, cost control, capacity shortage/overage control, and governance at a realm, region, and accessibility domain levels.
- Metering—provides required data for various corporate billing systems resulting in invoices to users. It also provides metadata for investigation, research, analysis, and insight into usage and discovery of patterns therein.
- Monitoring—is an observable system across all services for metrics, alarms, events, health status, and analytics resulting in a shorter and better feedback loop for service improvement.
- Service Platform—fast-tracks rollout of a system-wide (e.g., cloud-wide) feature enhancements by eliminating the need for all services to make code changes in response to each enhancement and supports authentication, authorization, audit, events, and quota enforcement.
- Tagging—allows users define key-value metadata (e.g., to tag a resource with a label) for their own visibility into the cloud-provider's resource usage across all services, compartments and tenancies for cost control, budget tracking, departmental charge back, and resource structuring.

Traditionally, such tests would be manually defined by experienced engineers. This can be incredibly labor intensive. For example, given 100 resources, to test that each of the 100 resources has 150 corresponding capabilities, or in other words, passes 150 set of requirements, would require authoring 15,000 tests. The term "capability" and "requirement" may be used interchangeably. As the number of resources and/or number of requirements grow, so too does the number of tests needed to ensure that each resource meets each requirement prior to release.

In some embodiments, a system is provided that drastically reduces the amount of manual labor needed to produce such tests and enables the system to expand to add new tests easily when new resources and capabilities/requirements are introduced. The system may utilize a declarative infrastructure provisioner (DIP). This DIP is configured to define and provision infrastructure resources (e.g., data center resources) using a declarative configuration language. In some examples, the codes steps for creating a resource may be encapsulated in a resource block (e.g., a code segment that includes the operations for creating a resource). Similarly, the test logic associated with testing a capability may be encapsulated in a resource block (e.g., a code segment that includes the operations for testing the capability). Each code segment corresponding to a capability may include one or more placeholders corresponding to one or more resources with which the capability will be tested. The operations for creating a resource and the test operations may be defined using a domain specific language optimized to include a limited set of parameterized, reusable, statements (e.g., functions). By way of example, one statement/function for resource creation may be expressed as a statement where the resource type is a parameter. In this case, when a test needs to include operations for creating multiple resources (e.g., a virtual cloud network (VCN), a subnet, a virtual machine/compute instance), the test may include the same statement three times, each time passing in a different parameter corresponding to each resource. An explicit example will be discussed in connection with FIG. 5 below.

In some embodiments, each test may be associated with corresponding metadata that indicates which capabilities (requirements) will be tested and which resources will be used for the test. Any suitable number of tests and corresponding instances of metadata may be utilized. Thus, while one test may test every capability against every resource in the system, another test may be used to test a subset of capabilities and/or a subset of resources.

By utilizing the techniques discussed herein, the complexity of authoring tests may be drastically reduced. Whereas to manually author each test would require a test written for every unique combination of resource to capability (e.g., with R resources and C capabilities, R*C manually created tests), using the disclosed techniques the labor may be reduced to only defining resources and capabilities once, while the system will handle combining the two (e.g., R+C manually created code segments).

Referring now to the drawings, FIG. 1 depicts an example of a computing environment 100 for deploying and testing various infrastructure resources in a cloud-computing environment, in accordance with at least one embodiment. The computing environment 100 may include a test environment 112 and a production environment 122. The test environment 112 and the production environment 122 may comprise one or more computing systems that execute computer-readable instructions (e.g., code, program) to implement the test environment 112 and the production environment 122. As depicted in FIG. 1, the test environment 112 includes a test system 108 and the production environment 122 includes a deployment orchestrator system 116. Portions of data or information used by or generated in the test environment 112 may be stored in a persistent memory such as a data store 120. The systems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The computing environment 100 depicted in FIG. 1 is merely an example and is not intended to unduly limit the scope of claimed embodiments. One of ordinary skill in the art would recognize many possible variations, alternatives, and modifications. For example, in some implementations, the computing environment 100 can be implemented using more or fewer systems than those shown in FIG. 1, may combine two or more systems, or may have a different configuration or arrangement of systems and subsystems.

The computing environment 100 may be implemented in various different configurations. In certain embodiments, the computing environment 100 comprising the test system 108 and the deployment orchestrator system 116 may be implemented in an enterprise servicing users of the enterprise. In other embodiments, the resources in the computing environment 100 may be implemented on one or more servers of a cloud provider and provided to subscribers of cloud services on a subscription basis.

In certain situations, to facilitate non-disruptive transition during an upgrade, or to provide a gradual change delivery model during the application development process, both an earlier version of the component and an updated (or new) version of the component may need to co-exist and execute in parallel the containerized environment for some time. In certain embodiments, the test system 108 and the deployment orchestrator system 116 include capabilities for enabling different versions of a component of a containerized application to co-exist on different computing nodes in a cluster of nodes of the containerized environment at the same time.

In certain embodiments, a user may interact with the test system 108 using a user device 102 that is communicatively coupled to the test system 108, possibly via one or more communication networks. The user device 102 may be of various types, including but not limited to, a mobile phone, a tablet, a desktop computer, and the like. The user may interact with the test system 108 using a browser and/or any suitable user interface to identify executed by the user device 102. For example, the user may use a user interface (UI) (which may be a graphical user interface (GUI)) of the browser executed by the user device 102 to interact with the test system 108.

At 104, a user may, via the UI, provide an application to be deployed in the computing environment. The application may represent a micro-service based containerized application that may be deployed in the production environment 122. In certain examples, the application 104 may comprise multiple resources where multiple instances of each resource can be executed as containers on nodes within a cluster of nodes in a containerized environment of the production environment 122. In certain examples, the containerized environment may be provided by a container orchestration platform such as Kubernetes, OpenShift, Docker Swarm, and the like. In certain examples, the application (comprising a set of one or more components) may be provided to the test system 108 prior to its deployment in the containerized environment.

At 105, the user may select and/or define, via the UI, one or more options to indicate a set of resources with which the user would like to test a set of capabilities. These resources and/or capabilities may be predefined as resource blocks and stored within data store 120. The test system 108 may include execution engine 110. Execution engine 110 may be configured to utilize the users input at 105 to identify and/or generate metadata that defines every combination of capability/resource pairs to be tested. The set of capabilities and/or resources from which this metadata may be generated may be obtained from the data store 120. Once generated, the metadata may be utilized by the execution engine 110 to generate an execution plan for the test. An execution plan may include a superset of every operation needed to perform the test on every unique combination of a capability and resource. In some embodiments, the execution engine 110 may be configured to optimize the execution plan such that redundant operations are removed and/or the efficiency of such operations is improved. These optimization may be identified based at least in part on a predefined set of rules. The execution engine may then execute the operations of the execution plan to produce output. This output may provide an outcome of each test corresponding to each resource/capability combination. It should be appreciated that the operations of 105 may be performed at any suitable time, according to a predefined schedule and/or periodicity, and/or according to user input obtained via a user interface provided by the test system 108.

At 107, the execution engine 110 may be configured to execute instructions for presenting the outcome of each test to the user device 102. In some embodiments, the outcome may be formatted as a matrix where the rows and columns of the matrix identify the resources and capabilities performed. As a non-limiting example, each column of the matrix may be identified as corresponding to a particular capability, while each row may be identified as corresponding to a particular resource. At the intersection of each resource and capability, the outcome of the test result may be presented. In some embodiments, the outcome may be indicated with a symbol, a color, an icon, text, or any suitable graphical element. As a non-limiting example, a box at the intersection of a particular resource and capability may include a gray box to indicate the resource is incapable of executing the capability, a red box to indicate the resource failed to demonstrate the capability, a green box to indicate the resource successfully demonstrated to capability, or a black box to indicate the capability was not tested on the resource.

In certain embodiments, as a result of the processing performed by the test system 108 (e.g., every test performed by the execution engine 110 was successful (e.g., each resource successfully demonstrated each applicable capability and/or user input processed by the test system 108), the test system 108 generates a deployment package 114 that includes the component(s) of the application 104 to be deployed and their associated network polices. A deployment orchestrator system 116 in the production environment 122 receives the deployment package 114 and uses the deployment package to deploy the component(s) of the application and to different nodes in a cluster of nodes in the containerized environment.

Figure 2:
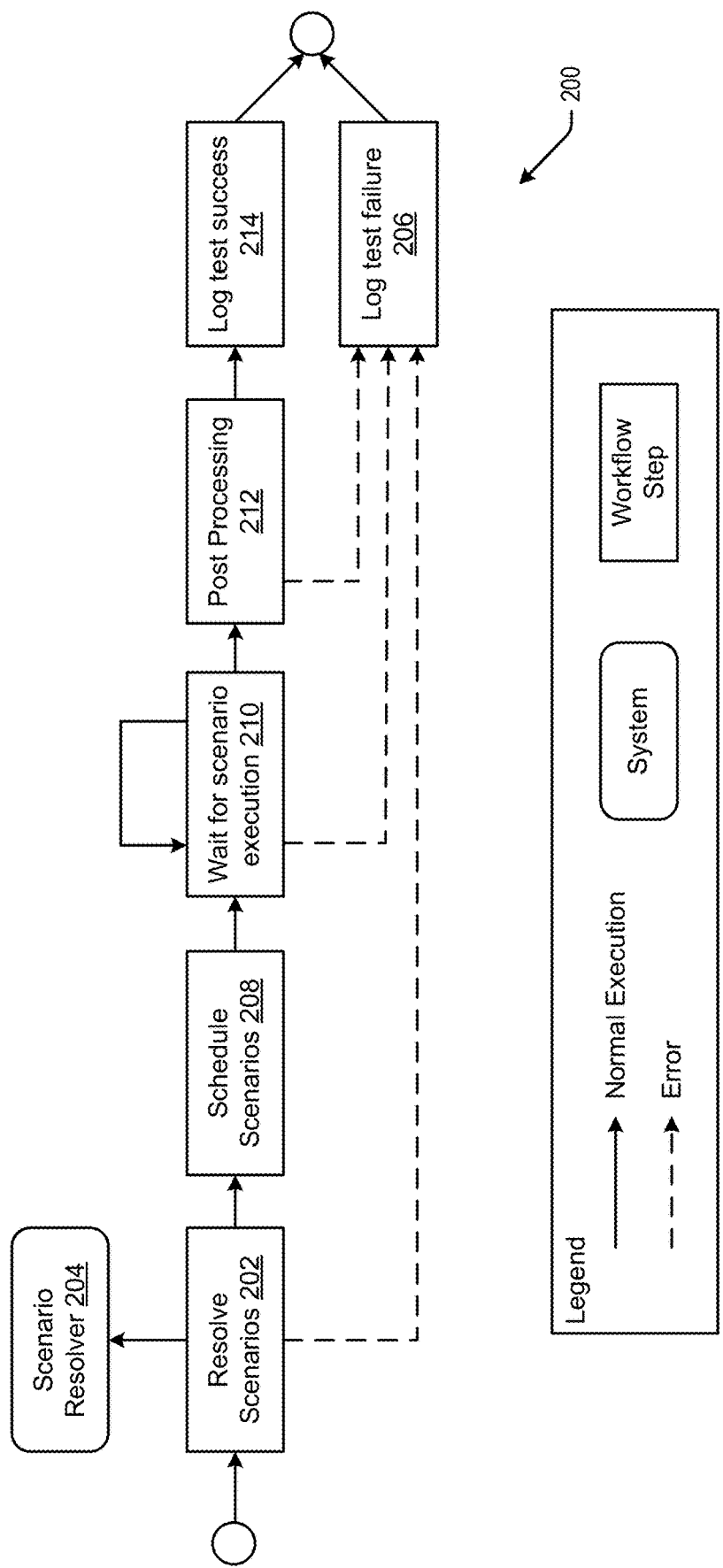
FIG. 2 depicts an example workflow 200 for executing an experiment, in accordance with at least one embodiment.

FIG. 2 depicts an example workflow 200 for executing an experiment, in accordance with at least one embodiment. An "experiment," as used herein, refers to use cases that execute and track one or more scenarios. A "scenario" refers to an execution of a test involving a single capability and a single resource (although the code segment for this resource may involve more than one resource). Some example experiments may include running the entire matrix (e.g., a matrix defining every resource and every capability and every possible combination of the two) at a predefined periodicity, frequency, and/or according to a predefined schedule. As another example, an experiment could include re-running part, or the entire matrix of scenarios as part of an operational re-drive. As yet more examples, an experiment may include running a set of scenarios on a particular tenancy (e.g., with a particular set of features), running a single scenario as part of a development process, and running all possible variations for a particular resource/requirement combination. A "variation" refers to a particular version of a scenario (e.g., operations for testing a particular capability in a particular manner). In some embodiments, there may be multiple variations of a given scenario maintained in the system (e.g., multiple code segments that correspond to the requirement, in which each code segment includes differing operations for testing the requirement with the resource).

Execution of an experiment is modeled in workflow 200. At 202, scenarios are resolved. During scenario resolution, a scenario resolver (e.g., a component of the execution engine 110 of FIG. 1) may be configured to determine coverage and variation specifications to generate a set of (resource, requirement, and variation) tuples for each test in the experiment. The term "coverage" refers to a particular part of the matrix on which scenarios are to be run (e.g., a range of resources and requirement). The tuples may be utilized to generate an execution plan that includes programmatic instructions for executing each scenario corresponding to a tuple of the set of tuples.

By way of example, user input may be received that indicates a range of resources and a range of requirements (referred to as capabilities). As a non-limiting example, the range of resources may include all resources and the range of requirements may include all requirements. Thus, the scenario resolver 204 may utilize a predefined set of rules to identify which variation of each scenario to utilize if there are multiple from which to choose. In some embodiments, the scenario resolver 204 may incrementally determine which variation to select for each scenario as part of a process it executes to generate (resource, requirement, variation) tuples for each test in the experiment. The tuples may then be utilized to generate an execution plan by appending a code segment corresponding to the requirement (a particular variation) to an execution plan and injecting the code segment of the resource in a position designated by a resource placeholder within the code segment corresponding to the requirement. An execution plan may include any suitable combination of: (1) exact lists of operations to be performed, (2) requirements for one or more tenancy where plan can be executed, and/or (3) cleanup steps/operations to be performed after plan execution. Each attempt to resolve a scenario (e.g., to generate the corresponding tuple, to append the code segment corresponding to the requirement, and/or to inject the code segment corresponding to the resource within the code segment corresponding to the requirement) may be successful, unsuccessful, or partially successful. In some embodiments, the experiment may be configured to continue with only some of the scenarios resolved successfully, while in some embodiments, the experiment may be aborted if there are one or more scenarios that are unsuccessful resolved or only partially successfully resolved. In some embodiments, if resolving a scenario is unsuccessful or partially successful, the status and any suitable data corresponding to the scenario may be logged as a test failure at 206.

At 208, the successfully resolved scenarios may be scheduled. It may be there are other tasks being performed by the execution engine such that the necessary processing resources may be unavailable immediately. Thus, the execution engine may utilize any suitable predefined rules for scheduling the scenarios to be run for a time when the processing resources are assumed to be available once again.

At 210, the scenarios may be executed according to the execution plan generated at 202 and the execution engine may wait for scenario execution to complete. In some embodiments, if at any time execution fails or is halted, the execution engine may log the failure and any suitable corresponding data at 206.

At 212, output data corresponding to each test (e.g., each resource, requirement, variation combination) may be processed to determine success or failure of each test. For every experiment execution additional data such as: timestamps (start time, completion time, etc.), status information (resolution success, scenario running success, etc.), overall completion percentage, and the like may be tracked. Any test failures may be logged at 206, while any successes may be logged at 214. In either case, any additional tracked data may be included in the log. The failures and successes logged at 206 and 214, respectively, may be presented at a user device (e.g., the user device 102 of FIG. 1) at any suitable time via any suitable interface provided by the execution engine. One example user interface (e.g., a graphical interface element) is discussed below with respect to FIG. 4.

Figure 3:
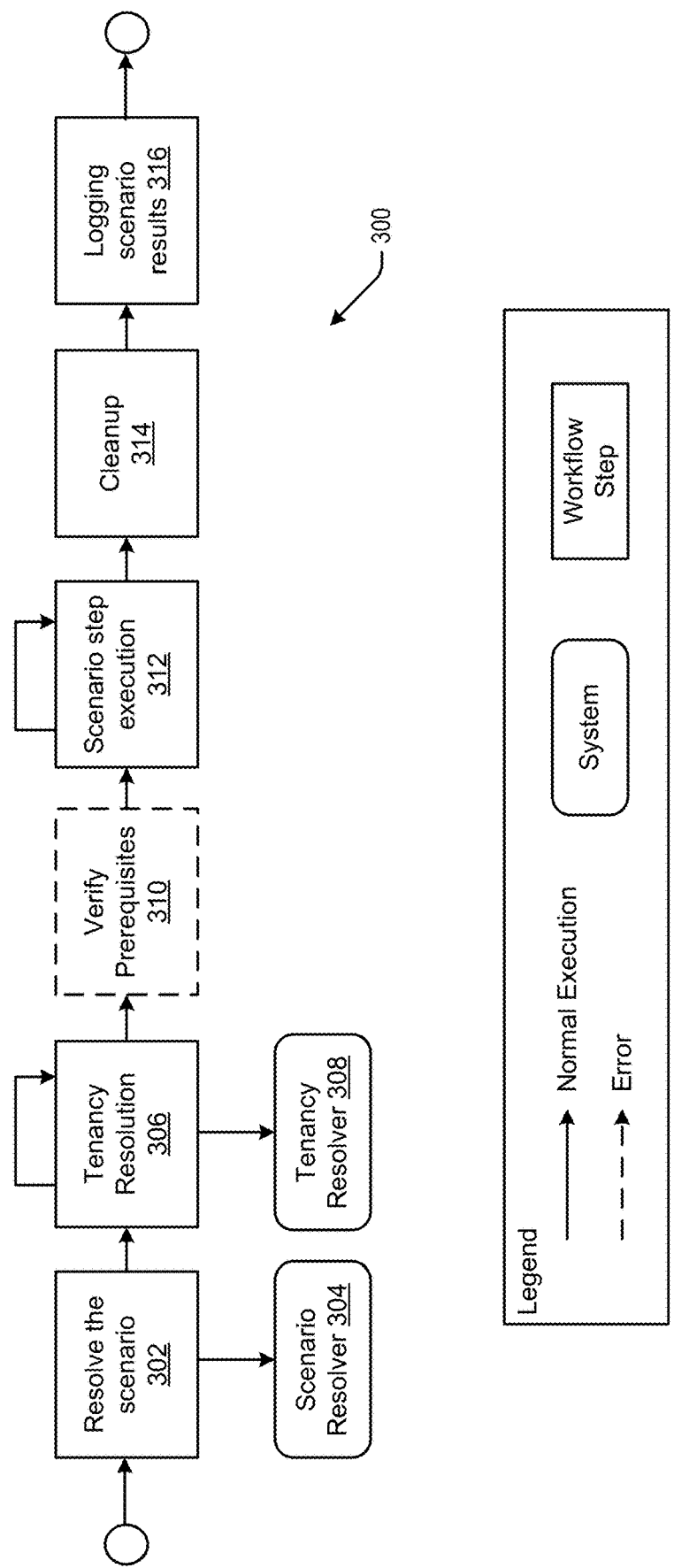
FIG. 3 depicts an example workflow for executing a scenario, in accordance with at least one embodiment.

FIG. 3 depicts an example workflow for executing a scenario, in accordance with at least one embodiment. As described above, a scenario refers to a single test of a given capability with respect to a given resource, or said another way, a test to determine whether a given resource meets a particular requirement.

At 302, the scenario may be resolved by the scenario resolver 304, a component of the execution engine 110 of FIG. 1. Resolving the scenario may include generating a tuple corresponding to the resource, requirement, and variation of requirement that is to be utilized to execute the scenario. The tuple may then be utilized to generate an execution plan that includes programmatic instructions for executing this particular scenario corresponding to the tuple.

At 306, a tenancy may be resolved (e.g., chosen from a set of tenancies) by the tenancy resolver 308 (e.g., a component of the execution engine 110) using the scenario, execution plan, and/or scenario metadata. The particular manner by which a particular tenancy is selected may be identified by a predefined set of rules. In some embodiments, execution of the execution plan may be paused until the chosen tenancy is available.

At 310, the execution engine may verify/ensure various prerequisites. The operations performed at this point in the workflow ensure that the tenancy has the necessary prerequisites for executing the scenario, or creates them. For example, before running scenario operation(s), a tenancy may be allocated (selected and/or generated) which meets certain expectations. For example, one expectation may identify that if the scenario is not idempotent, the tenancy should not run the scenario again. Another expectation may relate to a requirement prerequisite that specifies that in order to test that requirement, certain prerequisites may need to be met (e.g. zero limits need to be set for all resources). As another example, an expectation may relate to a resource prerequisite that specifies that in order to test that resource, certain prerequisites may need to be met (e.g. VPC for compute instances). As yet another example, an expectation may be a special requirement to run on a specific tenancy (e.g., as part of a virtual lab).

At 312, the scenario operation(s) may be executed according to the execution plan generated at 302 and the execution engine may wait for scenario execution to complete.

At 314, any suitable cleanup operation(s) defined within the execution plan may be executed to delete resources created during scenario execution.

At 316, output data corresponding to the scenario may be processed to determine the test's result (e.g., success or failure of the test). Scenario data including timestamps (start time, completion time, etc.), status information (scenario resolving success/failure, scenario running success/failure, etc.), overall completion percentage, and the like may be tracked. The test result may be presented at a user device (e.g., the user device 102 of FIG. 1) at any suitable time via any suitable interface provided by the execution engine.

FIG. 4 depicts an example graphical interface element 400 for presenting test results, in accordance with at least one embodiment. The graphical interface element 400 may vary in size depending on the number of capabilities and resources involved in the experiment. If running a single scenario, the graphical interface element 400 may be used to present a single test result. As depicted, the graphical interface element 400 represents a matrix in which the columns correspond to individual capabilities and the rows correspond to resources. Each intersecting box corresponds to a test result of a particular scenario. By way of example, test result 402 corresponds to a test result of testing whether resource 14 has capability 3 (e.g., whether resource 14 met a requirement corresponding to capability 3).

Legend 404 includes a number of statuses (e.g., status 1-4) indicated with a corresponding symbol. Although symbols are used in FIG. 4 to convey status, it should be appreciated that any suitable indicator such as test, characters, colors, or the like may be similarly used to express a test result. In some embodiments, the symbol 406 may indicate a successful test, symbol 408 may indicate a failed test, symbol 410 may indicate the capability was never implemented for the given resource, and symbol 412 may indicate particular capabilities that were not tested based on previously submitted user input. In some embodiments, the test results may be first collected in their entirety and the graphical interface element 400 may be generated and presented. While in other embodiments, the graphical interface element 400 may be presented as soon as test execution commences (or at any suitable time) and updated as test results are determined for each test.

Figure 5:
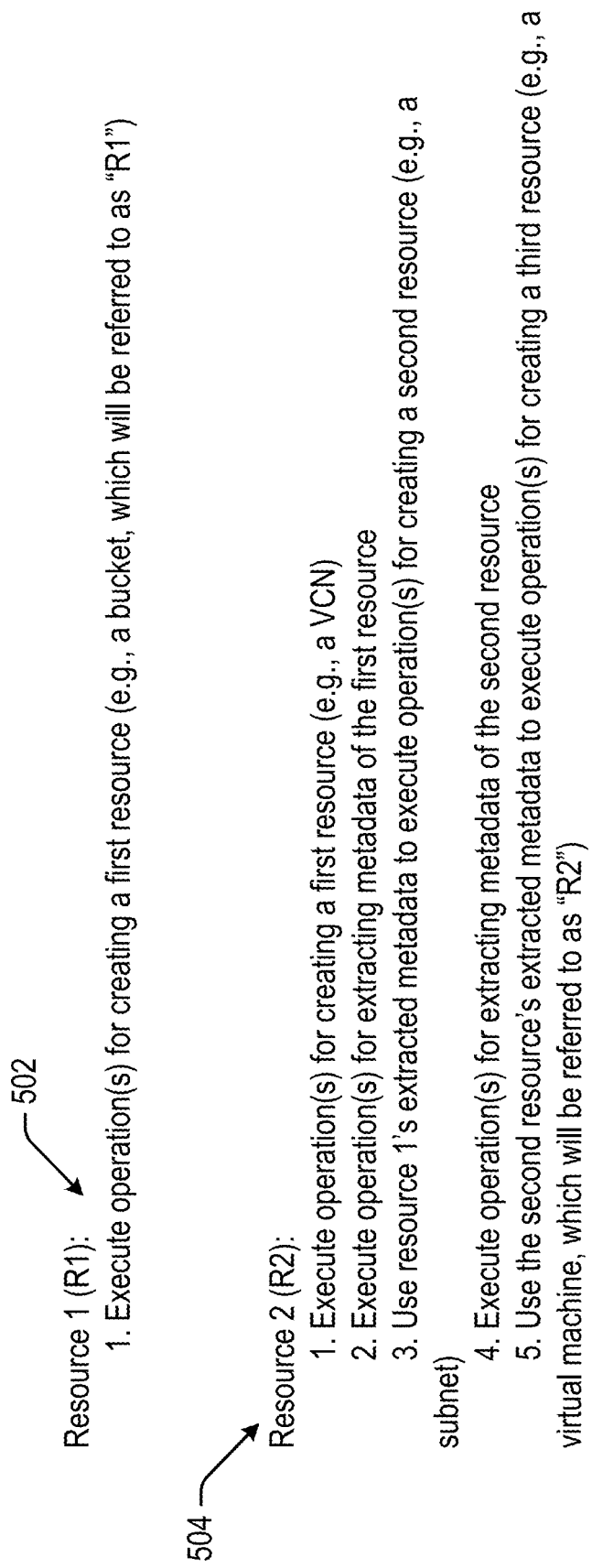
FIG. 5 depicts two example algorithms for creating a resource, in accordance with at least one embodiment.

FIG. 5 depicts two example algorithms for creating a resource, in accordance with at least one embodiment. Algorithm 502 specifies operation(s) for creating resource R1 (e.g., a bucket/storage container). Algorithm 504 specifies operation(s) for creating resource R2 (e.g., a virtual machine). The exact operations executed for each operation may vary. However, in some embodiments, each operation performed that utilizes a function call may utilize a function of a limited set of functions. For example, a domain specific language (DSL) may be predefined to be optimized for creating test plans. The functions provided in this DSL may relate to operations corresponding to communicating with programming interfaces of a declarative infrastructure provisioner (DIP). The DIP is configured to define and provision infrastructure resources (e.g., data center resources) using a declarative configuration language. Some functions of the DSL may correspond to call to a Representative State Transfer (REST) Application Programming Interface (API). A REST API refers to an API that conforms to constraints of a REST architecture style and allows for communication between two software programs of the cloud computing environment in which one program can request and/or manipulate resources of the other. Some functions of the DSL may relate to data manipulation such as assigning values to variables, utilizing expressions (e.g., type declarations, reading from memory, reading from settings, extracting a field, combining objects, etc.). Some functions of the DSL may relate to perform logical operations (e.g., Boolean operations, not, all, any, assert, etc.). Some functions of the DSL may relate to special instructions such as specifying a placeholder where resource operations may be injected.

As a non-limiting example, the DSL may include a single function call that may be utilized to create a resource. In some embodiments, the function may be overloaded and/or have multiple definitions/code segments that may vary depending on the resource to be generated. In some embodiments, a particular function of the set of overloaded functions may be selected based at least in part on the parameter list, which may indicate the particular type of resources to be created. Thus, the actual operations performed to create each resource may differ depending on the type of resource it is, however, the same function may be utilized, albeit with potentially different parameter lists. Similarly, the DSL may include a delete function that performs clean-up/delete operations on whatever resource is identified in the parameter list used when calling the function. Thus, the DSL may be made up of a relatively limited number of functions (e.g., 20, 24, 30, etc.), where each function may be thought of as providing a particular type of functionality, where the particular resource on which this functionality is applied depending on the parameter list used in the function call. Another function may relate to asserting a particular condition is true. The particular condition being checked for truth may be determined based on the parameter list past into the assert function. As an example, a string (e.g., "TagPresent") may be passed in the parameter list of an Assert function that determines whether a particular condition is true (e.g., is a tag present for a given resource). The function may operate on a resource object (e.g., resourceObject.Assert("TagPresent").

Algorithm 502 may be defined within a code segment associated with the resource type (e.g., bucket). Thus, any time a user desired to create a resource of that resource type, the same code segment may be used.

Algorithm 504 may define different operations of a different code segment that is associated with a resource type (e.g., a virtual machine) that is different from the resource type associated with algorithm 502. In some embodiments, like that of algorithm 504, creating a resource (e.g., resource R2) may depend on creating other resources first. Thus, as algorithm 504 depicts, the code segment defined for creating a resource of this type (e.g., a virtual machine) may include first executing one or more operations for creating a first resource (e.g., executing a create resource function and indicating a virtual cloud network (vcn) is to be created). An object (or other suitable container) may be returned upon executing those operations. The object may be associated with any suitable attribute that describes aspects of the resource (e.g., name, type, identifier, etc.). Once the first resource is created, the algorithm may specify that particular data (e.g., an identifier (ID) for the vcn) may be extracted from the returned object. The extracted data may then be utilized to create a second resource (e.g., by executing the create resource function with an indication that a subnet is to be created). The creation of the second resource may require the extracted data (e.g., the vcn ID) which may be passed in a parameter list (e.g., in the parameter list of the create resource function). An object (e.g., corresponding to the subnet) may be returned. Once the second resource is created, the algorithm may specify that particular data (e.g., an identifier (ID) for the subnet) may be extracted from the returned object. The extracted data may then be utilized to create a third resource (e.g., by executing the create resource function with an indication that a virtual machine is to be created). The creation of the third resource may require the extracted data (e.g., the subnet ID) from the second resource, which may be passed in a parameter list (e.g., in the parameter list of the create resource function). An object (e.g., corresponding to the virtual machine) may be returned. It should be appreciated, that the same function for creating a resource may be utilized to create the first resource, the second resource, and the third resource, although each will use different parameter list that identify the particular function call to correspond to a particular type of resource. Similarly, extracting metadata from the first and second resources may utilize the same function call but utilize a parameter list that designates the particular metadata to extract from the object.

Figure 6:
FIG. 6 depicts two example algorithms for creating a capability, in accordance with at least one embodiment.

FIG. 6 depicts two example algorithms for creating a capability, in accordance with at least one embodiment. Algorithm 602 specifies one or more operations for testing whether a resource implements a particular capability C1 (e.g., whether a resource meets a particular requirement). Algorithm 604 specifies one or more operations for testing whether a resource implements another capability C2 (e.g., a virtual machine). The exact operations executed for each operation may vary depending on the capability (and/or variation of the capability). However, in some embodiments, each operation performed that utilizes a function call within the code segment associated with each capability may utilize a function of a limited set of functions described above with respect to FIG. 5.

By way of example, algorithm 602 may relate to capability C1 (e.g., the ability to tag a resource with a label). Algorithm 602 may include operations for creating a resource placeholder (e.g., a placeholder where a code segment corresponding to a resource is to be inserted) and a number of operations (e.g., "A," "B," and "C") that are directed to testing whether a resource implements that particular capability. As a non-limiting example, for testing the ability to tag a resource with a label, the operations may call a REST API to tag a resource, then call another REST API to get the tag of a resort, and then execute an assert function call to assert that the tag is present. The assert function call may be configured to return true if a tag is associated with the resource or false if no tag is associated with the resource.

In some embodiments, a capability C2 may relate to checking whether a non-privileged user is restricted from deleting a resource. Thus, the first algorithmic step may cause a user (e.g., a type of resource) to be created. An object may be return that is represents the created user and provide access to attributes associated with the user (e.g., name, privileges, identifiers, etc.). Like algorithm 602, algorithm 604 may include one or more operations for creating a resource placeholder that designates a position within the code segment associated with capability C2 where a code segment corresponding to a resource is to be inserted and a number of operations (e.g., "A," "D," "E," and "F") that are directed to testing whether a resource implements that particular capability. The remaining operations of algorithm 604 may provide the various operations for testing whether a non-privileged user is restricted from deleting a resource. By way of example, the user resource created in step one may be utilized to call a REST API to attempt to delete the resource created at step 2, then a REST API may be called to attempt to get access to the resource, and then an assert function call may be executed to assert that the resource is present/not deleted. The assert function may be configured to return true when the resource is accessible and false when it is not.

FIG. 7 depicts an example execution plan 700 for testing the capabilities of FIG. 6 as executed with the resources of FIG. 5, in accordance with at least one embodiment. Although the execution plan 700 is described in algorithmic steps, it should be appreciated that an execution plan includes the code for the operations to be performed. The execution plan 700 depicts four tests that correspond to each unique combination of R1 and R2 of FIG. 5 and C1 and C2 of FIG. 6. That is, each test corresponds to a test to check whether a given resource (e.g., a bucket for R1, a virtual machine for R2) implements a particular capability (e.g., can the resource be tagged in accordance with C1, can a non-privileged user delete the resource in accordance with C2).

Test 1 may include code segments corresponding to algorithm 502 and 602 of FIGS. 5 and 6, respectively. By way of example, the code segment corresponding to capability C1 (e.g., algorithm 602) may be appended to the execution plan. A create resource placeholder may be identified. The system (e.g., the execution engine 110 of FIG. 1) may identify a first resource with which the capability will be tested (e.g., R1 according to a matrix and/or tuples generated via user input as described in FIG. 2). The system may retrieve the code segment corresponding to that resource and inject that code segment within the code segment corresponding to the capability C1. Thus, the sub-points within test 1 each represent operations defined in the combination of the code segment associated with R1 and the code segment associated with capability C1.

Test 2 may include code segments corresponding to algorithm 504 and 602 of FIGS. 5 and 6, respectively. By way of example, the code segment corresponding to capability C1 (e.g., algorithm 602) may be appended to the execution plan (e.g., after the code segments already added for test 1). A create resource placeholder may be identified. The system may identify a second resource with which the capability will be tested (e.g., R2 according to a matrix and/or tuples generated via user input as described in FIG. 2). The system may retrieve the code segment corresponding to that resource and inject that code segment within the code segment corresponding to the capability C1. Thus, the sub-points within test 2 each represent operations defined in the combination of the code segment associated with R2 and the code segment associated with capability C1.

This process may be repeated any suitable number of times depending on the number of resources with which capability C1 is to be tested. This would depend on the tuples and/or matrix that specify which tests are to be performed (and what variations are to be used for each test).

Continuing with the example, test 3 may include code segments corresponding to algorithm 502 and 604 of FIGS. 5 and 6, respectively. By way of example, the code segment corresponding to capability C2 (e.g., algorithm 604) may be appended to the execution plan (after the code segments for test 1 and test 2). A create resource placeholder may be identified. The system may identify a first resource with which the capability C2 will be tested (e.g., R1 according to a matrix and/or tuples generated via user input as described in FIG. 2). The system may retrieve the code segment corresponding to that resource and inject that code segment within the code segment corresponding to the capability C2. Thus, the sub-points within test 3 each represent operations defined in the combination of the code segment associated with R1 and the code segment associated with capability C2.

Test 4 may include code segments corresponding to algorithm 504 and 604 of FIGS. 5 and 6, respectively. By way of example, the code segment corresponding to capability C2 (e.g., algorithm 604) may be appended to the execution plan (e.g., after the code segments already added for tests 1, 2, and 3). A create resource placeholder may be identified. The system may identify a second resource with which the capability will be tested (e.g., R2 according to a matrix and/or tuples generated via user input as described in FIG. 2). The system may retrieve the code segment corresponding to that resource and inject that code segment within the code segment corresponding to the capability C2. Thus, the sub-points within test 4 each represent operations defined in the combination of the code segment associated with R2 and the code segment associated with capability C2.

This process may be repeated any suitable number of times depending on the number of resources with which capability C2 is to be tested. This would depend on the tuples and/or matrix that specify which tests are to be performed (and what variations are to be used for each test). It should be appreciated that tests 1-4 may be arranged in any suitable order within the execution plan 700, not necessarily the order depicted in FIG. 7.

Figure 8:
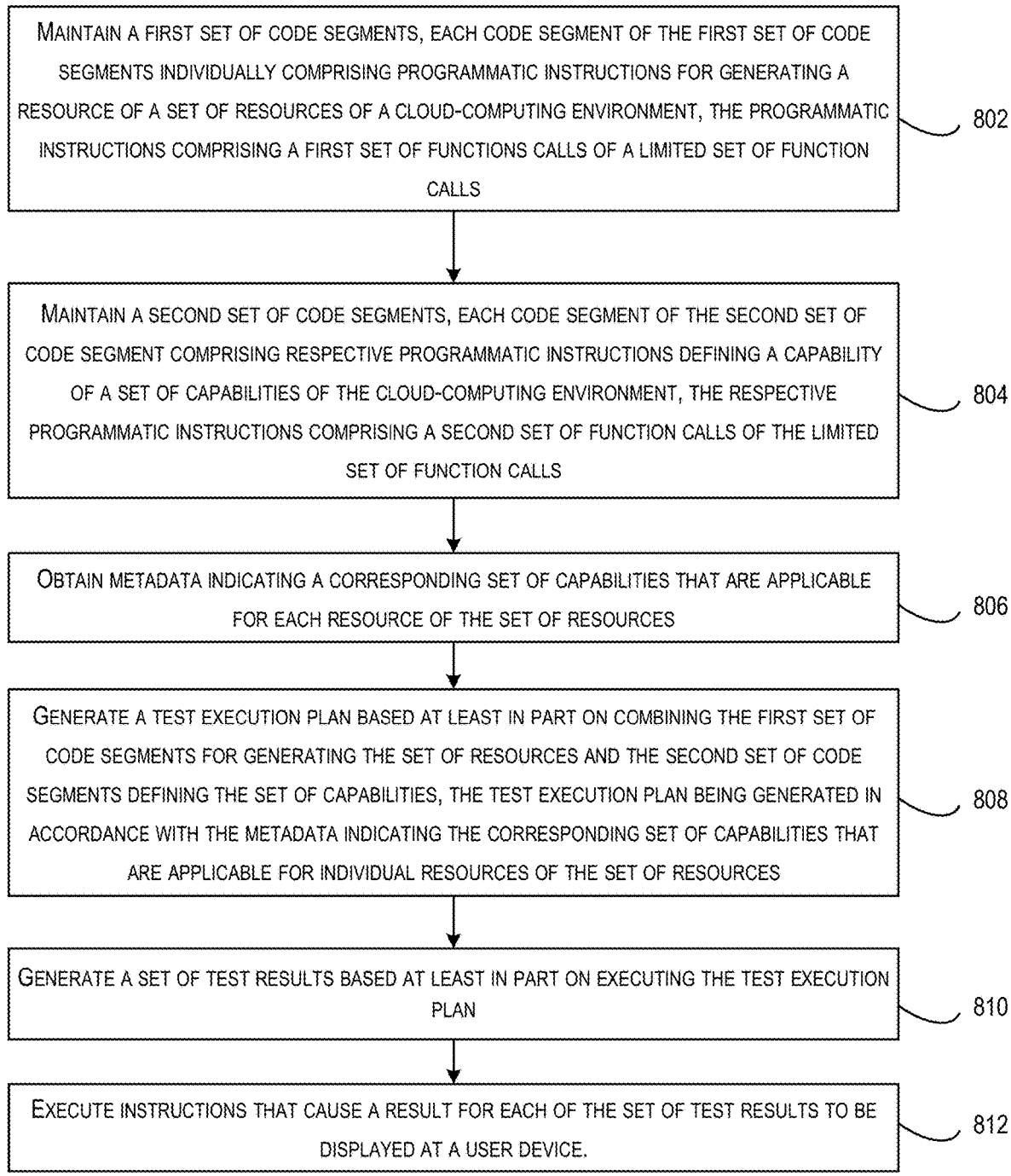
FIG. 8 is an example of a method for generating and executing an execution plan, in accordance with at least one embodiment.

FIG. 8 is an example of a method 800 for generating and executing an execution plan, in accordance with at least one embodiment. The operations of method 800 may be performed in any suitable order. Although a number of operations are described in connection with FIG. 8, it should be appreciated that more or fewer operations may be utilized. In some embodiments, the method 800 may be performed by the execution engine 110 of FIG. 1 (e.g., as part of the test system 108 of FIG. 1, or as part of an execution engine operations as part of the production environment 122 of FIG. 1, etc.).

The method 800 may begin at 802, where a first set of code segments is maintained (e.g., in data store 120 of FIG. 1). In some embodiments, each code segment of the first set of code segments (e.g., the code segments of FIG. 5) individually comprise programmatic instructions (e.g., one or more lines of codes) for generating a resource of a set of resources of a cloud-computing environment. The programmatic instructions comprise a first set of functions calls of a limited set of function calls (e.g., some subset of the function calls discussed in connection with FIG. 5) that are optimized for generating execution plans in the cloud-computing environment.

At 804, a second set of code segments is maintained (e.g., in the data store 120 of FIG. 1). In some embodiments, each code segment of the second set of code segments (e.g., the code segments of FIG. 6) comprises respective programmatic instructions defining a capability of a set of capabilities of the cloud-computing environment. The respective programmatic instructions comprise a second set of function calls of the limited set of function calls.

At 806, metadata (e.g., the tuples discussed in connection with FIGS. 2 and/or 3) indicating a corresponding set of capabilities that are applicable for each resource of the set of resources is obtained (e.g., generated based on user input).

At 808, an execution plan is generated based at least in part on combining the first set of code segments for generating the set of resources and the second set of code segments defining the set of capabilities. The execution plan may be generated in accordance with the metadata indicating the corresponding set of capabilities that are applicable for individual resources of the set of resources. By way of example, each of the second set of code segments may include one or more placeholders that indicate a position at which a code segment corresponding to a resource is to be injected as described in connection with FIG. 7. In some embodiments, generating execution plan may include removing repetitive function calls (e.g., two instances of the same function call within the same code segment).

At 810, a set of test results is generated based at least in part on executing the execution plan.

At 812, instructions that cause a result for each of the set of test results to be displayed at a user device are executed. By way of example, each of the set of test results may be displayed at the graphical interface element 400 of FIG. 4 as part of a matrix of test results.

Example Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud-computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound/outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
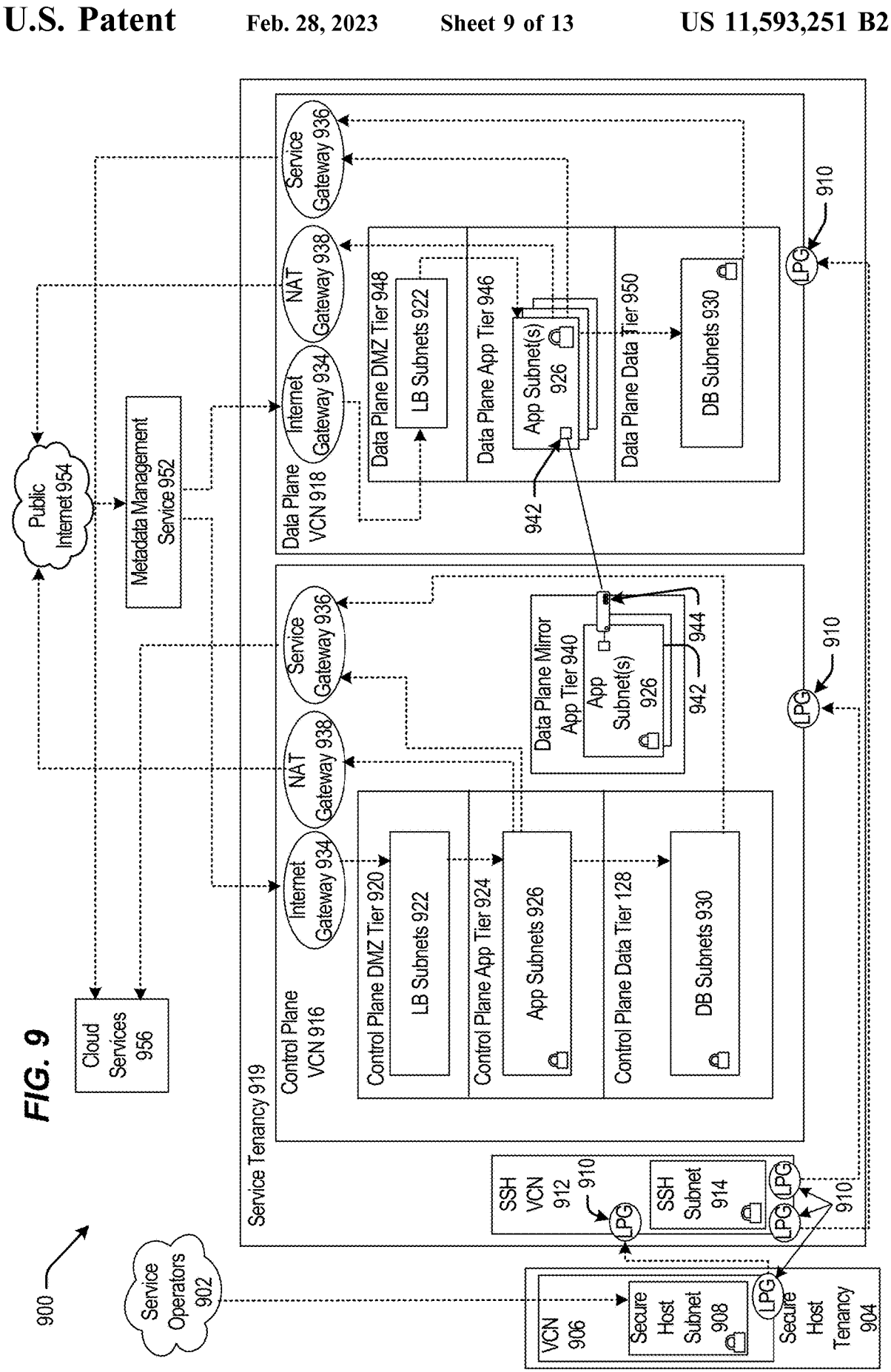
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 9, Palm OS, and the like, and being Internet, e-mail, short message service (SMS), Blackberry®, or other communication protocol enabled. Alternatively, the client computing devices can be general-purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Memory that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
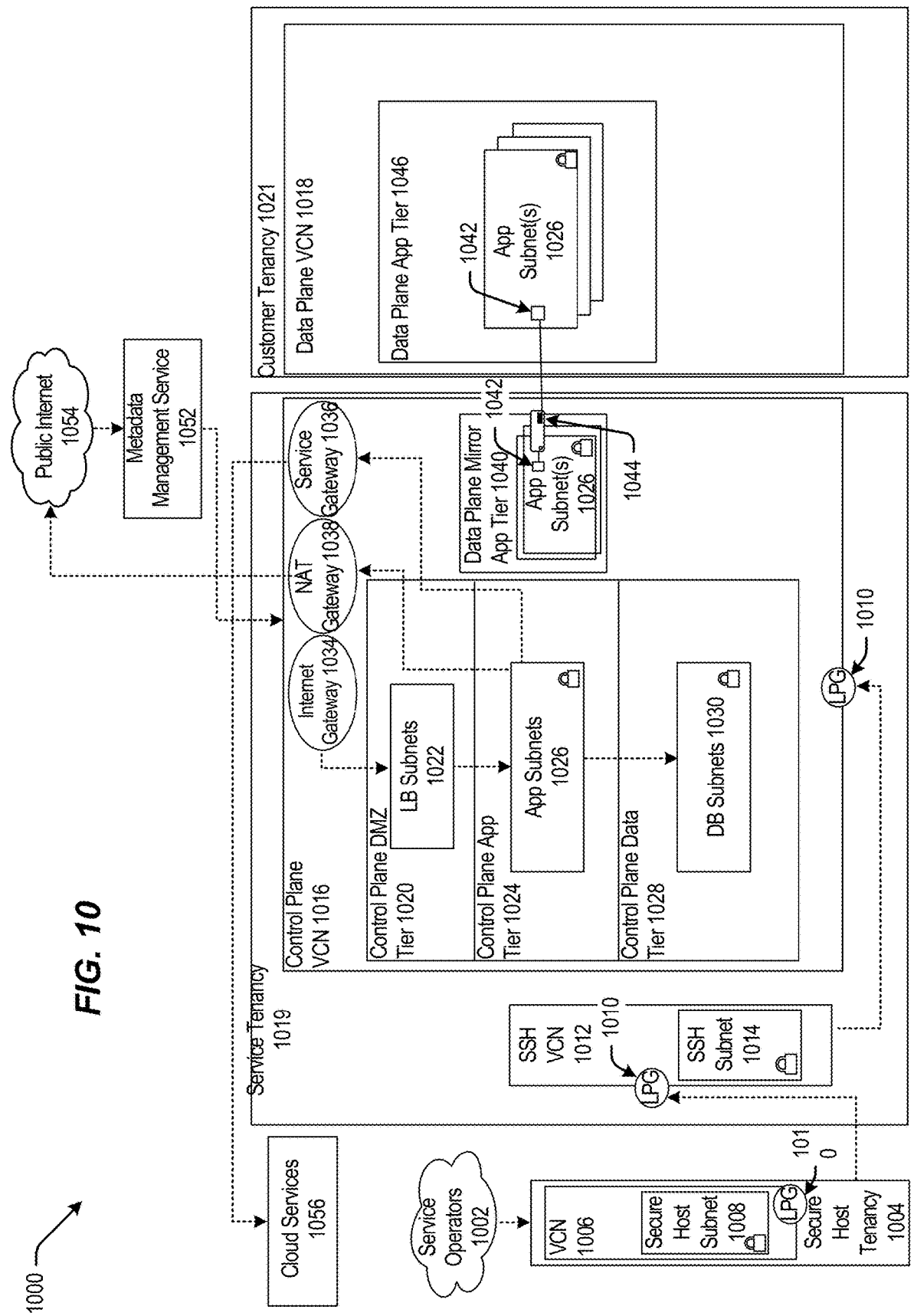
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 902 of FIG. 9) can be communicatively coupled to a secure host tenancy 1004 (e.g. the secure host tenancy 904 of FIG. 9) that can include a virtual cloud network (VCN) 1006 (e.g. the VCN 906 of FIG. 9) and a secure host subnet 1008 (e.g. the secure host subnet 908 of FIG. 9). The VCN 1006 can include a local peering gateway (LPG) 1010 (e.g. the LPG 910 of FIG. 9) that can be communicatively coupled to a secure shell (SSH) VCN 1012 (e.g. the SSH VCN 912 of FIG. 9) via an LPG 910 contained in the SSH VCN 1012. The SSH VCN 1012 can include an SSH subnet 1014 (e.g. the SSH subnet 914 of FIG. 9), and the SSH VCN 1012 can be communicatively coupled to a control plane VCN 1016 (e.g. the control plane VCN 916 of FIG. 9) via an LPG 1010 contained in the control plane VCN 1016. The control plane VCN 1016 can be contained in a service tenancy 1019 (e.g. the service tenancy 919 of FIG. 9), and the data plane VCN 1018 (e.g. the data plane VCN 918 of FIG. 9) can be contained in a customer tenancy 1021 that may be owned or operated by users, or customers, of the system.

The control plane VCN 1016 can include a control plane DMZ tier 1020 (e.g. the control plane DMZ tier 920 of FIG. 9) that can include LB subnet(s) 1022 (e.g. LB subnet(s) 922 of FIG. 9), a control plane app tier 1024 (e.g. the control plane app tier 924 of FIG. 9) that can include app subnet(s) 1026 (e.g. app subnet(s) 926 of FIG. 9), a control plane data tier 1028 (e.g. the control plane data tier 928 of FIG. 9) that can include database (DB) subnet(s) 1030 (e.g. similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g. the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g. the service gateway of FIG. 9) and a network address translation (NAT) gateway 1038 (e.g. the NAT gateway 938 of FIG. 9). The control plane VCN 1016 can include the service gateway 1036 and the NAT gateway 1038.

The control plane VCN 1016 can include a data plane mirror app tier 1040 (e.g. the data plane mirror app tier 940 of FIG. 9) that can include app subnet(s) 1026. The app subnet(s) 1026 contained in the data plane mirror app tier 1040 can include a virtual network interface controller (VNIC) 1042 (e.g. the VNIC of 942) that can execute a compute instance 1044 (e.g. similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g. the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g. the metadata management service 952 of FIG. 9) that can be communicatively coupled to public Internet 1054 (e.g. public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g. cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 8," may be located in Region 1 and in "Region 2." If a call to Deployment 8 is made by the service gateway 1036 contained in the control plane VCN 1016 located in Region 1, the call may be transmitted to Deployment 8 in Region 1. In this example, the control plane VCN 1016, or Deployment 8 in Region 1, may not be communicatively coupled to, or otherwise in communication with, Deployment 8 in Region 2.

Figure 11:
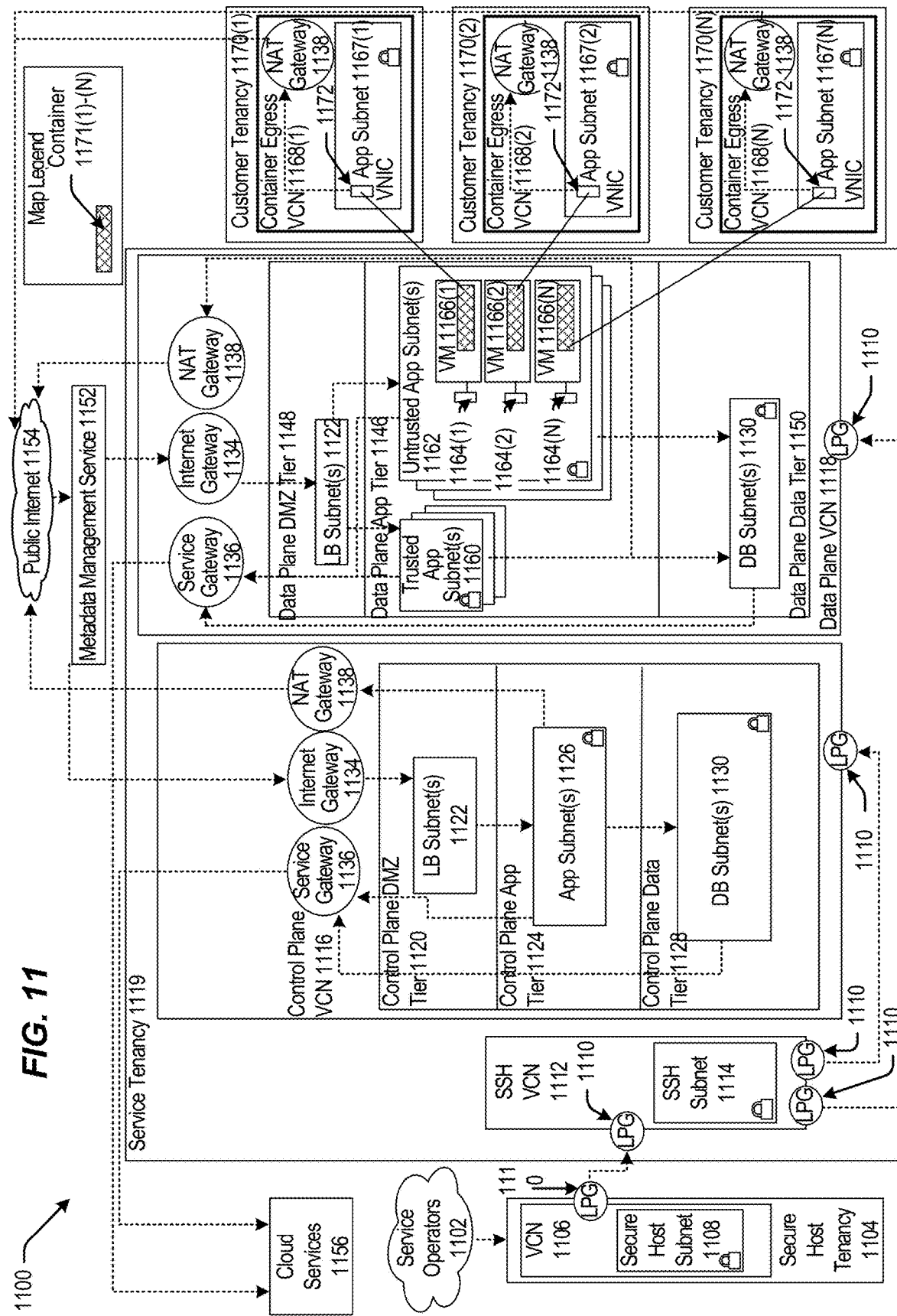
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 902 of FIG. 9) can be communicatively coupled to a secure host tenancy 1104 (e.g. the secure host tenancy 904 of FIG. 9) that can include a virtual cloud network (VCN) 1106 (e.g. the VCN 906 of FIG. 9) and a secure host subnet 1108 (e.g. the secure host subnet 908 of FIG. 9). The VCN 1106 can include an LPG 1110 (e.g. the LPG 910 of FIG. 9) that can be communicatively coupled to an SSH VCN 1112 (e.g. the SSH VCN 912 of FIG. 9) via an LPG 1110 contained in the SSH VCN 1112. The SSH VCN 1112 can include an SSH subnet 1114 (e.g. the SSH subnet 914 of FIG. 9), and the SSH VCN 1112 can be communicatively coupled to a control plane VCN 1116 (e.g. the control plane VCN 916 of FIG. 9) via an LPG 1110 contained in the control plane VCN 1116 and to a data plane VCN 1118 (e.g.

the data plane 918 of FIG. 9) via an LPG 1110 contained in the data plane VCN 1118. The control plane VCN 1116 and the data plane VCN 1118 can be contained in a service tenancy 1119 (e.g. the service tenancy 919 of FIG. 9).

The control plane VCN 1116 can include a control plane DMZ tier 1120 (e.g. the control plane DMZ tier 920 of FIG. 9) that can include load balancer (LB) subnet(s) 1122 (e.g. LB subnet(s) 922 of FIG. 9), a control plane app tier 1124 (e.g. the control plane app tier 924 of FIG. 9) that can include app subnet(s) 1126 (e.g. similar to app subnet(s) 926 of FIG. 9), a control plane data tier 1128 (e.g. the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 9) and a network address translation (NAT) gateway 1138 (e.g. the NAT gateway 938 of FIG. 9). The control plane VCN 1116 can include the service gateway 1136 and the NAT gateway 1138.

The data plane VCN 1118 can include a data plane app tier 1146 (e.g. the data plane app tier 946 of FIG. 9), a data plane DMZ tier 1148 (e.g. the data plane DMZ tier 948 of FIG. 9), and a data plane data tier 1150 (e.g. the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g. public Internet 954 of FIG. 9).

The Internet gateway 1134 contained in the control plane VCN 1116 and contained in the data plane VCN 1118 can be communicatively coupled to a metadata management service 1152 (e.g. the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
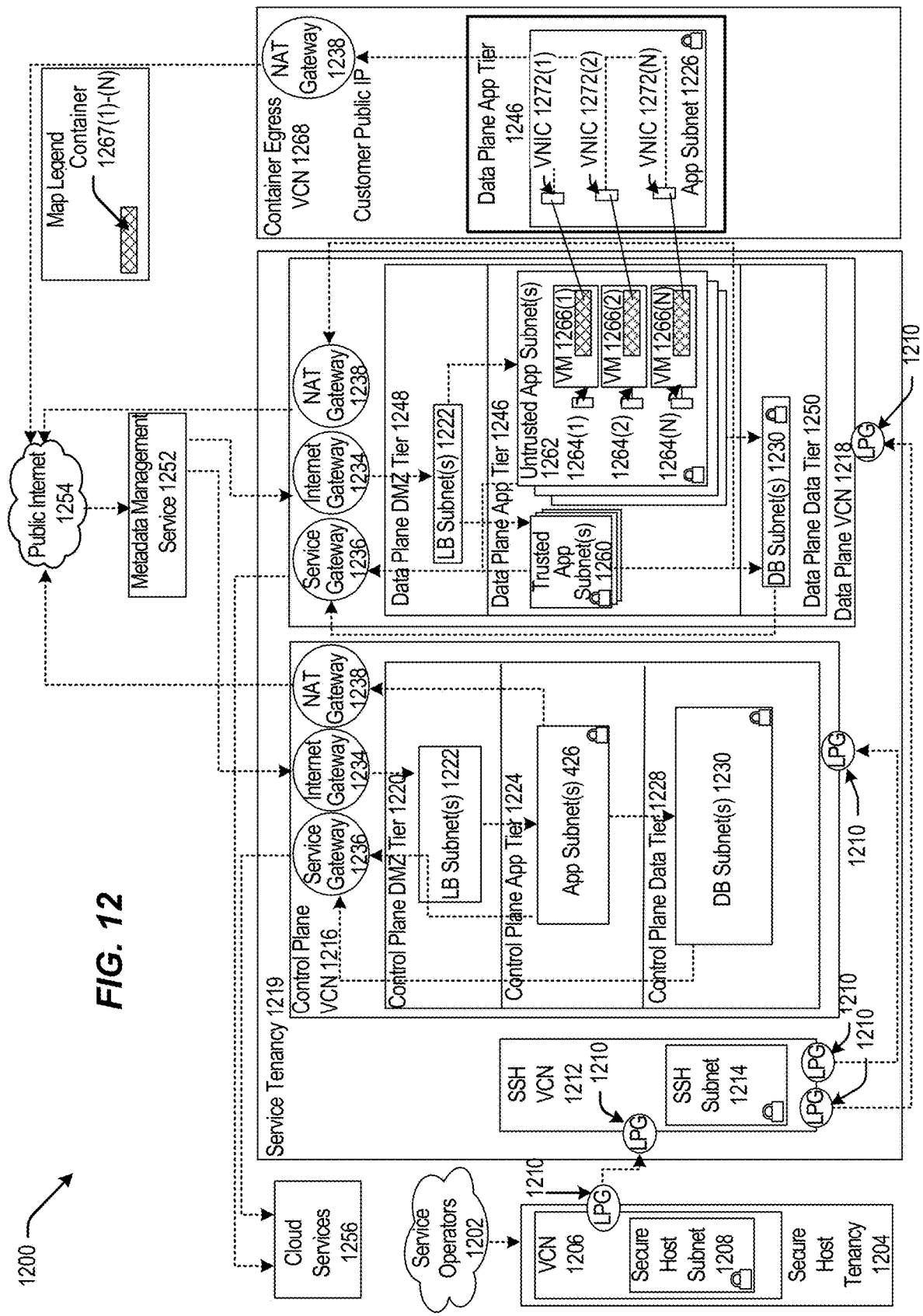
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 902 of FIG. 9) can be communicatively coupled to a secure host tenancy 1204 (e.g. the secure host tenancy 904 of FIG. 9) that can include a virtual cloud network (VCN)

1206 (e.g. the VCN 906 of FIG. 9) and a secure host subnet 1208 (e.g. the secure host subnet 908 of FIG. 9). The VCN 1206 can include an LPG 1210 (e.g. the LPG 910 of FIG. 9) that can be communicatively coupled to an SSH VCN 1212 (e.g. the SSH VCN 912 of FIG. 9) via an LPG 1210 contained in the SSH VCN 1212. The SSH VCN 1212 can include an SSH subnet 1214 (e.g. the SSH subnet 914 of FIG. 9), and the SSH VCN 1212 can be communicatively coupled to a control plane VCN 1216 (e.g. the control plane VCN 916 of FIG. 9) via an LPG 1210 contained in the control plane VCN 1216 and to a data plane VCN 1218 (e.g. the data plane 918 of FIG. 9) via an LPG 1210 contained in the data plane VCN 1218. The control plane VCN 1216 and the data plane VCN 1218 can be contained in a service tenancy 1219 (e.g. the service tenancy 919 of FIG. 9).

The control plane VCN 1216 can include a control plane DMZ tier 1220 (e.g. the control plane DMZ tier 920 of FIG. 9) that can include LB subnet(s) 1222 (e.g. LB subnet(s) 922 of FIG. 9), a control plane app tier 1224 (e.g. the control plane app tier 924 of FIG. 9) that can include app subnet(s) 1226 (e.g. app subnet(s) 926 of FIG. 9), a control plane data tier 1228 (e.g. the control plane data tier 928 of FIG. 9) that can include DB subnet(s) 1230 (e.g. DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g. the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g. the service gateway of FIG. 9) and a network address translation (NAT) gateway 1238 (e.g. the NAT gateway 938 of FIG. 9). The control plane VCN 1216 can include the service gateway 1236 and the NAT gateway 1238.

The data plane VCN 1218 can include a data plane app tier 1246 (e.g. the data plane app tier 946 of FIG. 9), a data plane DMZ tier 1248 (e.g. the data plane DMZ tier 948 of FIG. 9), and a data plane data tier 1250 (e.g. the data plane data tier 950 of FIG. 9). The data plane DMZ tier 1248 can include LB subnet(s) 1222 that can be communicatively coupled to trusted app subnet(s) 1260 (e.g. trusted app subnet(s) 1160 of FIG. 11) and untrusted app subnet(s) 1262 (e.g. untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g. public Internet 954 of FIG. 9).

The Internet gateway 1234 contained in the control plane VCN 1216 and contained in the data plane VCN 1218 can be communicatively coupled to a metadata management service 1252 (e.g. the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
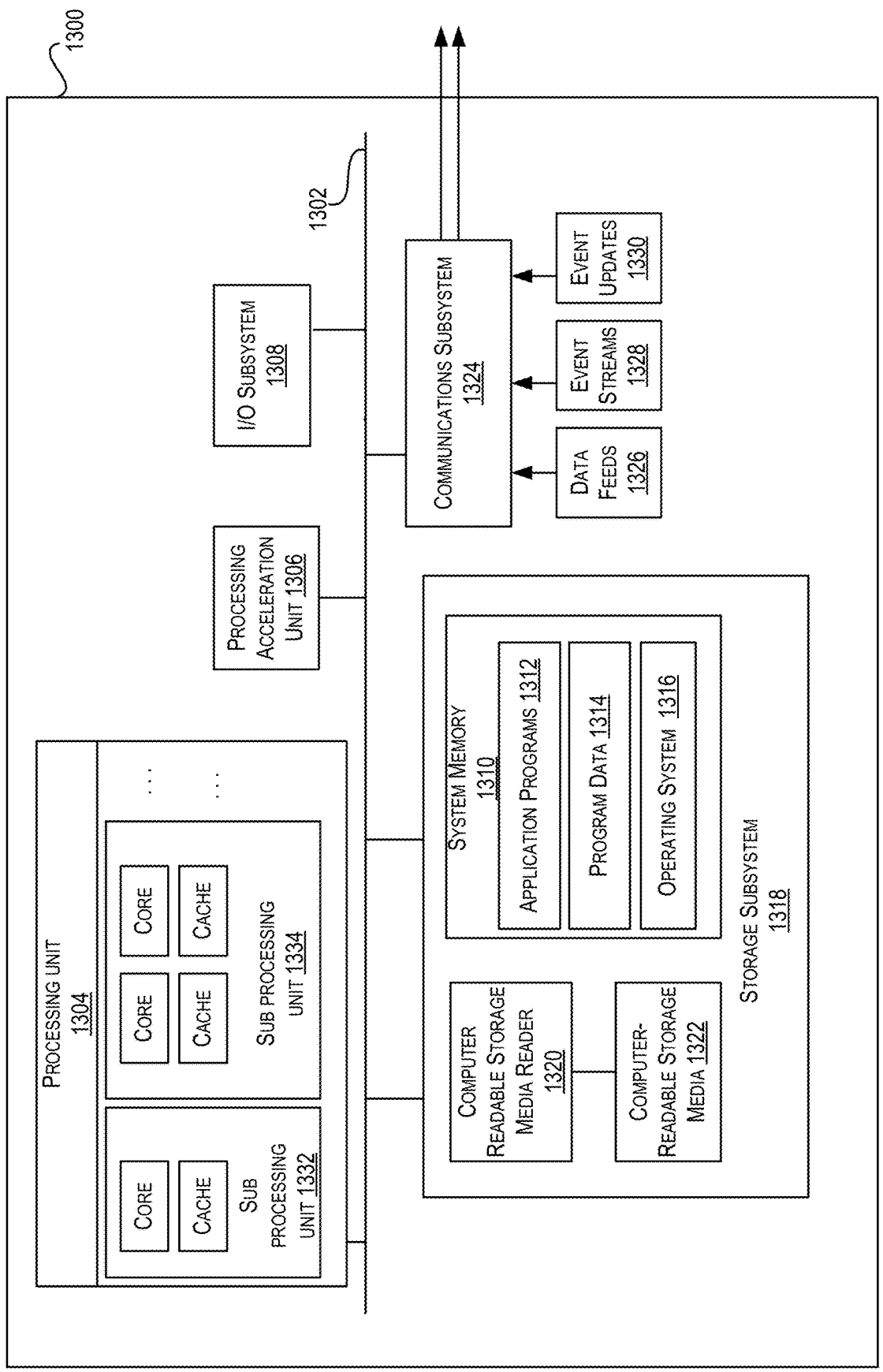
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 13 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present disclosure.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
maintaining a first code segment comprising a first set of programmatic instructions that, when executed, generate a particular resource of a set of resources of a cloud-computing environment, the first set of programmatic instructions comprising a first set of functions calls of a limited set of function calls that are optimized for generating execution plans in the cloud-computing environment;
maintaining a second code segment comprising a second set of respective programmatic instructions that, when executed, test whether the respective resource implements a capability of a set of capabilities of the cloud-computing environment, the second set of respective programmatic instructions comprising a second set of function calls of the limited set of function calls;
obtaining metadata indicating that a first resource is to implement the capability;
in response to identifying that the metadata indicates that the first resource is to implement the capability, generating an execution plan comprising a combined code segment, the combined code segment being generated based at least in part on inserting the first code segment for creating the respective resource into the second code segment comprising the second set of respective programmatic instructions that, when executed, test whether the respective resource implements the capability, the combined code segment specifying first operations for generating the first resource and second operations for testing whether the first resource implements the capability;
generating a set of test results based at least in part on executing the first operations and the second operations of the combined code segment of the execution plan; and
executing instructions that cause a result for each of the set of test results to be displayed at a user device.

2. The computer-implemented method of claim 1, wherein a subset of function calls of the limited set of function calls relate to at least one of:
calling a first application programming interface of the cloud-computing environment, calling a second application programming interface of a declarative infrastructure provisioner, manipulating data associated with a given resource or given capability, executing Boolean logic with at least one resource or at least one capability, importing programmatic instructions associated with a specific resource, or importing programmatic instructions associated with a particular capability.

3. The computer-implemented method of claim 2, wherein the declarative infrastructure provisioner is configured to define and provision infrastructure resources using a declarative configuration language.

4. The computer-implemented method of claim 1, wherein the execution plan comprises programmatic instructions for executing a respective test corresponding to each capability of a plurality of capabilities that is applicable to a given resource of a plurality of resources.

5. The computer-implemented method of claim 1, further comprising removing redundant programming instructions from the execution plan prior to executing the execution plan.

6. The computer-implemented method of claim 1, wherein each of the set of test results is presented in a graphical matrix.

7. The computer-implemented method of claim 1, wherein at least one function call in the limited set of function calls comprises two or more overloaded functions, wherein a particular overloaded function is selected for execution based at least in part on a set of parameters used to call the at least one function call.

8. A computing device, comprising:
a processor; and
a memory storing instructions that, when executed by the processor, configure the computing device to:
maintain a first code segment comprising a first set of programmatic instructions that, when executed, generate a particular resource of a set of resources of a cloud-computing environment, the first set of programmatic instructions comprising a first set of functions calls of a limited set of function calls that are optimized for generating execution plans in the cloud-computing environment;
maintain a second code segment comprising a second set of respective programmatic instructions that, when executed, test whether the respective resource implements a capability of a set of capabilities of the cloud-computing environment, the second set of respective programmatic instructions comprising a second set of function calls of the limited set of function calls;
obtain metadata indicating that a first resource is to implement the capability;
in response to identifying that the metadata indicates that the first resource is to implement the capability, generate an execution plan comprising a combined code segment, the combined code segment being generated based at least in part on inserting the first code segment for creating the respective resource into the second code segment comprising the second set of respective programmatic instructions that, when executed, test whether the respective resource implements the capability, the combined code segment specifying first operations for generating the first resource and second operations for testing whether the first resource implements the capability;
generate a set of test results based at least in part on executing the first operations and the second operations of the combined code segment of the execution plan; and
execute instructions that cause a result for each of the set of test results to be displayed at a user device.

9. The computing device of claim 8, wherein a subset of function calls of the limited set of function calls relate to at least one of: calling a first application programming interface of the cloud-computing environment, calling a second application programming interface of a declarative infrastructure provisioner, manipulating data associated with a given resource or given capability, executing Boolean logic with at least one resource or at least one capability, importing programmatic instructions associated with a specific resource, or importing programmatic instructions associated with a particular capability.

10. The computing device of claim 9, wherein the declarative infrastructure provisioner is configured to define and provision infrastructure resources using a declarative configuration language.

11. The computing device of claim 8, wherein the execution plan comprises programmatic instructions for executing a respective test corresponding to each capability of a plurality of capabilities that is applicable to a given resource of a plurality of resources.

12. The computing device of claim 8, wherein the computing device is further configured to remove redundant programming instructions from the execution plan prior to executing the execution plan.

13. The computing device of claim 8, wherein each of the set of test results is presented in a graphical matrix.

14. The computing device of claim 8, wherein at least one function call in the limited set of function calls comprises two or more overloaded functions, wherein a particular overloaded function is selected for execution based at least in part on a set of parameters used to call the at least one function call.

15. A non-transitory computer-readable medium storing computer-executable instructions that, when executed by one or more processors of a computing device, cause the computing device to:
maintain a first code segment comprising a first set of programmatic instructions that, when executed, generate a particular resource of a set of resources of a cloud-computing environment, the first set of programmatic instructions comprising a first set of functions calls of a limited set of function calls that are optimized for generating execution plans in the cloud-computing environment;
maintain a second code segment comprising a second set of respective programmatic instructions that, when executed, test whether a respective resource implements a capability of a set of capabilities of the cloud-computing environment, the second set of respective programmatic instructions comprising a second set of function calls of the limited set of function calls;
obtain metadata indicating that a first resource is to implement the capability;
in response to identifying that the metadata indicates that the first resource is to implement the capability, generate an execution plan comprising a combined code segment, the combined code segment being generated based at least in part on inserting the first code segment for creating the respective resource into the second code segment comprising the second set of respective programmatic instructions that, when executed, test whether the respective resource implements the capability, the combined code segment specifying first operations for generating the first resource and second operations for testing whether the first resource implements the capability;

generate a set of test results based at least in part on executing the first operations and the second operations of the combined code segment of the execution plan; and execute instructions that cause a result for each of the set of test results to be displayed at a user device.

16. The non-transitory computer-readable medium of claim 15, wherein a subset of function calls of the limited set of function calls relate to at least one of: calling a first application programming interface of the cloud-computing environment, calling a second application programming interface of a declarative infrastructure provisioner, manipulating data associated with a given resource or given capability, executing Boolean logic with at least one resource or at least one capability, importing programmatic instructions associated with a specific resource, or importing programmatic instructions associated with a particular capability.

17. The non-transitory computer-readable medium of claim 15, wherein the computing device is further configured to remove redundant programming instructions from the execution plan prior to executing the execution plan.

18. The non-transitory computer-readable medium of claim 15, wherein each of the set of test results is presented in a graphical matrix.

19. The non-transitory computer-readable medium of claim 15, wherein at least one function call in the limited set of function calls comprises two or more overloaded functions, wherein a particular overloaded function is selected for execution based at least in part on a set of parameters used to call the at least one function call.

20. The computer-implemented method of claim 1, further comprising:

obtaining second metadata indicating that a second resource is to implement the capability; and in response to identifying that the second metadata indicates that the second resource is to implement the capability, modifying the execution plan to comprise a second combined code segment, the second combined code segment being generated based at least in part on inserting the first code segment for creating the respective resource into the second code segment comprising the second set of respective programmatic instructions that, when executed, test whether the second resource implements the capability, the second combined code segment specifying third operations for generating the second resource and fourth operations for testing whether the second resource implements the capability.

\* \* \* \* \*